Nov. 27, 1934.  P. HANSEN  1,982,514
SAFETY DEVICE FOR COMPRESSED AIR OR OTHER FLUID PRESSURE PIPE SYSTEMS
Filed Dec. 23, 1932
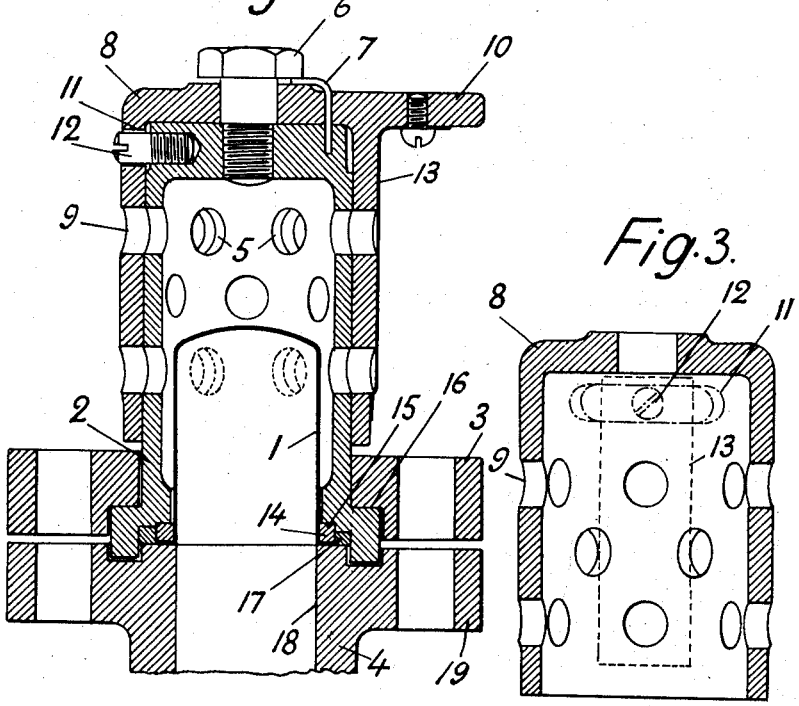
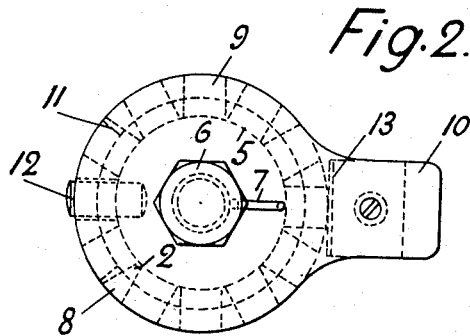
P. Hansen
INVENTOR
By: Marks & Clerk
Attys.

Patented Nov. 27, 1934

1,982,514

UNITED STATES PATENT OFFICE 1,982,514

SAFETY DEVICE FOR COMPRESSED AIR OR OTHER FLUID PRESSURE PIPE SYSTEMS

Paul Hansen, Copenhagen, Denmark

Application December 23, 1932, Serial No. 648,681
In Germany January 2, 1932

4 Claims. (Cl. 251—9)

This invention relates to an improved safety device for compressed-air and other fluid pressure pipes and has for its object the production of a particularly simple and suitable device for guarding against damage which may occur in the event of an exceptionally high pressure arising in the pipe.

The invention relates primarily to compressed-air supply systems for internal combustion engines and more particularly to the starting-air pipes of reversible internal combustion engine power units manœuvred by the aid of compressed air. Usually the compressed air in such internal combustion engine power plants is produced in a compressor of the reciprocating piston type and lubricating oil is therefore liable to reach the compressed-air pipes. If the starting-air valves of the internal combustion engine are not leak-proof or if they open simultaneously with the supply of fuel, hot air may enter the compressed-air pipes and result in an explosion owing to the particles of oil or oil vapour contained in the air.

In connection with vessels containing fluid under high pressure it is known to employ safety devices comprising a membrane or like element which is disruptable by reason of the thinness of its walls in such a manner that it will burst under an exceptionally high pressure in the pressure fluid pipe, the known devices employing mainly a breaking piece in the form of a thin metal disc. According to the present invention, however, the disruptable member consists of a substantially cylindrical or dome-shaped, thin-walled cap which is surrounded by a shield or outer casing having a plurality of air openings therein.

The disruptable element may suitably be made of copper or other material of analogous tenacity, so that the disruptable element will be cheap to make. The copper or like material has also the advantage that it does not burst asunder so easily as steel into numerous small fragments. The surrounding outer casing serves to restrain the metal fragments from distribution in all directions in the engine room in the event of an explosion, while the openings in the casing serve to allow the escape of the air or other pressure fluid which may take place, even if parts of the disruptable cap by the explosion should be pressed against and cover some of the openings in the casing.

The invention has also for its object to obviate delay in the manœuvring operation when the disruptable element bursts. A certain amount of time is required to remove the disrupted element and replace it by a new one and the shield or outer casing is therefore formed according to the invention so that it enables the pressure fluid pipe to be rapidly re-sealed without substituting a new disruptable element.

For this purpose the shield or outer casing may consist of two cages, one surrounding the other and both having holes for the escape of the air or other pressure fluid, the holes in one cage normally registering with the holes in the other, but being displaceable relatively to one another by relative displacement of the cages so that the escape of air or other pressure fluid through them will be interrupted.

The outer cage is preferably so constructed that it can rapidly be moved relatively to the inner cage, e. g. by the blow of a hammer or the like, so that the air holes are closed. The outer cage, for example, may be provided with a projection so that by hammering on it, the cage will turn. To limit the movement of the outer cage a stop can be provided.

The two cages may be secured together by a screw which permits relative rotation of the cages. To secure the outer cage in its normal position a frangible pin or the like may be used which passes through the two cage walls and which is weak enough to break when a blow is imparted to the projection on the outer cage.

The shield or outer casing may also be provided externally with an indicator, for example, a thin metal plate deflected outwards by the pressure of escaping air or other fluid. In the case of multi-cylinder engines with several disruptable elements it is thus possible to see at once which of them has burst.

The invention is illustrated in the accompanying drawing whereon

Fig. 1 is a sectional view through one constructional form of disruptable element with surrounding cages.

Fig. 2 is a plan view thereof, and

Fig. 3 is a sectional view through the outer cage.

In Fig. 1 is shown a disruptable element 1, which is in the form of a substantially cylindrical thin-walled cap or dome and made of copper or like material soldered to a ring 14. A cage 2 surrounds the dome 1 and has an annular seat 15 which can be pressed down on to the ring 14 by means of a loose collar 3 resting on an annular seat 16 on the cage 2. The cage 2 and dome 1 are firmly fixed by bolts not shown to a branch 4 connected to the compressed-air or other fluid pressure pipe, the bolts passing through bolt holes in the collar 3 and in a flange 19 on the branch 4. A fluid-tight joint is effected by packing 17 and a recess 18.

The cage 2 has holes 5 and is provided at its upper end with a screw-threaded aperture for a screw 6 which in conjunction with a locking pin 7 secures in position an outer cage 8 closely surrounding the cage 2. The outer cage 8 has holes 9 which normally register with the holes 5 in the inner cage 2. The cage 8 is also provided with a lug or projection 10 and an elongated slot 11 through which passes a limiting screw 12 which is screwed firmly into the inner cage 2 and serves to limit the movement of the outer cage relative to the inner one.

Screwed to the lug 10 is an indicator which consists of a thin metal plate 13 resting against the side of the outer cage and covering some of its holes 9.

The device operates as follows:— When an exceptionally high pressure arises in the compressed-air pipe, for example, by explosion of lubricating oil in the pipe during reversal of the engine, the dome 1 is burst and the air escapes with such high force through the openings 5 and 9 that the thin plate 13 is deflected outwards. The attendant can then break the pin 7 by a blow on the lug 10 and turn the cage 8 into a position in which it covers the holes 5 in the cage 2, thereby again sealing the compressed-air pipe so that the manœuvring operation can be continued. After the manœuvring operation has been completed, the cages are removed and the broken dome is exchanged for a new one.

The invention is not limited to the construction described with reference to the accompanying drawing which is given only as an example, but may be carried out in other ways without departing from the invention hereinafter claimed.

I claim:—

1. A safety device for fluid pressure pipe systems comprising a disruptable cap adapted to be subjected to the pressure in the pressure fluid pipe, said cap being thin and disruptable under excessive pressure, said disruptable cap being surrounded by a shielding member consisting of two cages one surrounding and being displaceable relatively to the other and each having a set of holes, the two sets of holes being so arranged that by relative displacement of the cages they may be brought out of or into register.

2. A safety device as claimed in claim 1 in which the outer cage has a projecting part so arranged that the outer cage can be displaced relatively to the inner cage by a blow on said projecting part.

3. A safety device as claimed in claim 1 in which a frangible pin extends through both cage walls for the purpose of locking the outer cage to the inner cage in a position in which the two sets of holes in the two cages are in register, said pin being adapted to be broken when the outer cage is actuated for displacement relatively to the inner cage.

4. A safety device as claimed in claim 1 in which the outer cage is provided with an indicator, consisting of a thin plate arranged outside the cage and covering some of the holes of the cage, said plate being adapted for being deflected outwards by the air stream striking out through the holes, when the disruptable element is broken due to an excessive pressure in the pressure fluid pipe.

PAUL HANSEN.